(12) United States Patent
Sahasrabudhe et al.

(10) Patent No.: US 7,970,498 B2
(45) Date of Patent: Jun. 28, 2011

(54) MODEL BASED SENSOR SYSTEM FOR LOADS AWARE CONTROL LAWS

(75) Inventors: Vineet Sahasrabudhe, Hamden, CT (US); Alex Faynberg, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1305 days.

(21) Appl. No.: 11/756,640

(22) Filed: Jun. 1, 2007

(65) Prior Publication Data
US 2010/0017048 A1   Jan. 21, 2010

(51) Int. Cl.
G05D 1/00 (2006.01)
(52) U.S. Cl. ............................................. 701/3
(58) Field of Classification Search .............. 701/3, 14; 244/75.1, 76 R; 340/945
See application file for complete search history.

(56) References Cited

U.S. PATENT DOCUMENTS

| | | | |
|---|---|---|---|
| 4,103,848 A | 8/1978 | Johnson, Jr. et al. | |
| 5,799,901 A | 9/1998 | Osder | |
| 5,850,615 A | 12/1998 | Osder | |
| 5,951,608 A | 9/1999 | Osder | |
| 6,012,676 A | 1/2000 | Gold et al. | |
| 6,061,611 A | 5/2000 | Whitmore | |
| 6,122,102 A | 9/2000 | Gehris et al. | |
| 6,189,836 B1 | 2/2001 | Gold et al. | |
| 6,259,975 B1 * | 7/2001 | Rollet et al. | 701/3 |
| 6,332,105 B1 * | 12/2001 | Calise et al. | 701/3 |
| 6,843,126 B2 | 1/2005 | Hulsing, II | |
| 6,873,887 B2 | 3/2005 | Zagranski et al. | |
| 6,885,917 B2 | 4/2005 | Osder et al. | |
| 7,032,861 B2 | 4/2006 | Sanders, Jr. et al. | |

FOREIGN PATENT DOCUMENTS

| | | |
|---|---|---|
| WO | 93/05457 A1 | 3/1993 |
| WO | 93/05460 A1 | 3/1993 |
| WO | 93/05462 A1 | 3/1993 |

OTHER PUBLICATIONS

International Search Report for International Appl. No. PCT/US2008/065229 dated Jun. 29, 2009.

* cited by examiner

Primary Examiner — Yonel Beaulieu
(74) Attorney, Agent, or Firm — Carlson Gaskey & Olds PC

(57) ABSTRACT

A flight control system includes a model-based sensor system which estimates angular accelerations to control rotor system moment such that loads on the aircraft structure are reduced to thereby allow an aircraft structural envelope to more closely follow an aircraft service flight envelope.

21 Claims, 5 Drawing Sheets

MODEL BASED SENSOR SYSTEM FOR LOADS AWARE CONTROL LAWS

BACKGROUND OF THE INVENTION

The present invention relates to an aircraft model-based sensor system, and more particularly to a model-based virtual sensor system for calculation of angular acceleration from measured dynamic quantities that are available in a flight control computer for subsequent utilization in feedback flight control systems to reduce aircraft flight loads while maintaining maneuvering performance.

The structure of a rotary-wing aircraft is designed to withstand flight loads that occur during all phases of aircraft operation such as aerodynamic forces and moments from the fuselage and the rotor system. Flight loads typically peak during maneuvering flight. An aircraft structural envelope is designed relative an aircraft Operational Flight Envelope (OFE) and Service Flight Envelope (SFE) with a margin to more than accommodate peak flight loads. The margin is often provided by reinforced aircraft structure. Although effective, aircraft weight is concomitantly increased.

Loads Aware Control Laws afford the opportunity to save structural weight by limiting the peak loads encountered during flight. Main rotor generated hub moments are the primary contributors to these peak loads as rotor hub moments are transferred to the aircraft structure through the rotor system. One way to reduce hub moments on a rotary-wing aircraft is to control rotor blade flapping without decreasing aircraft maneuverability and agility.

Control of rotor blade flapping requires accurate determination of moment for input into the Loads Aware Control Laws of a fly-by-wire flight control system. Determination through direct measurement of flapping or a related quantity requires a rotating frame measurement and a methodology to transfer that measurement to the fixed frame. Although direct measurement through a specially instrumented rotor hub having a sensor system within the rotating frame typical of flight test instrumented aircraft is conventionally utilized, such instrumentation may not be practical for operations in a field environment.

Accordingly, it is desirable to provide a model-based sensor system for use with a feedback flight control system to control rotor hub moment such that loads on the aircraft structure are reduced to thereby allow an aircraft structural envelope to more closely follow the aircraft OFE or SFE.

SUMMARY OF THE INVENTION

A flight control system according to an exemplary aspect of the present invention includes a model-based sensor system which estimates angular accelerations for input to Loads Aware Control Laws. Loads Aware Control Laws afford the opportunity to save structural weight by limiting peak loads encountered during flight. One of the techniques used as part of loads aware control laws is calculation of angular acceleration for use in feedback control from commonly measured dynamic quantities that are available in the flight control computer. The focus is on main rotor generated hub moments, though other systems such as tail rotor systems will also benefit herefrom.

A model-based moment sensor algorithm includes two primary paths—an angular rate path and a stick input path. The two paths are calculated in parallel and then combined using a complementary filter like process. Stick input and angular rate are readily provided as standard signals by the fly-by-wire flight control system. An inertial measurement unit (IMU) may for example, provide the pitch rate, while the longitudinal stick measurement is obtained from a cyclic stick sensor.

The angular rate path and the stick input path estimates are then combined using a complementary filtering technique. The stick input path "fast" estimate is passed through a high pass filter and is added to the pitch rate path "slow" estimate, which has been passed through a low pass filter. The filtered estimates are then summed to produce a balance of low frequency and high frequency which provides an accurate estimate of the angular acceleration.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
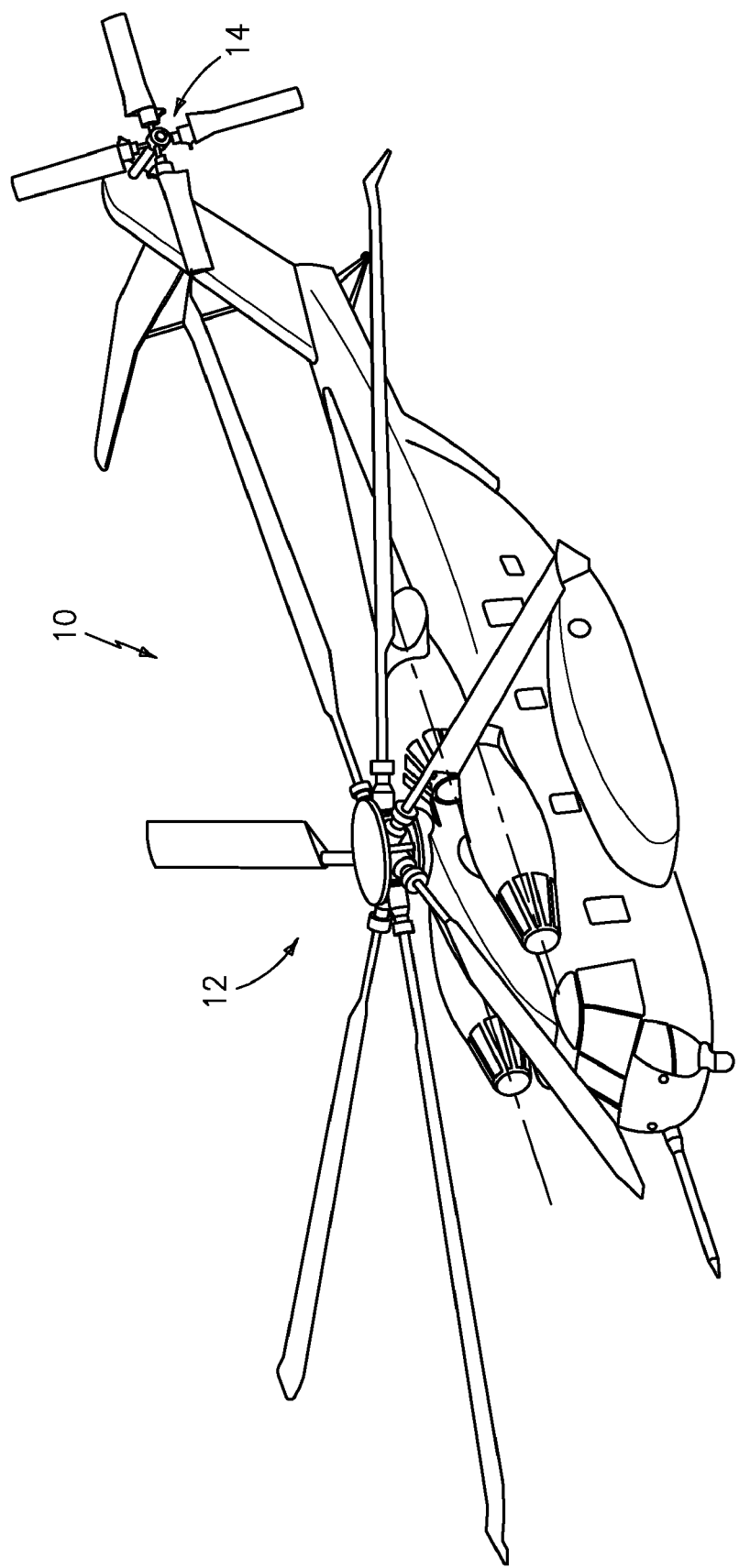
FIG. 1 is a general perspective view an exemplary rotary wing aircraft embodiment for use with the present invention.

FIG. 1 illustrates a general perspective view of a helicopter embodiment 10 of a rotary wing aircraft for use with the present invention. The helicopter includes a main rotor assembly 12 and tail rotor assembly 14. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
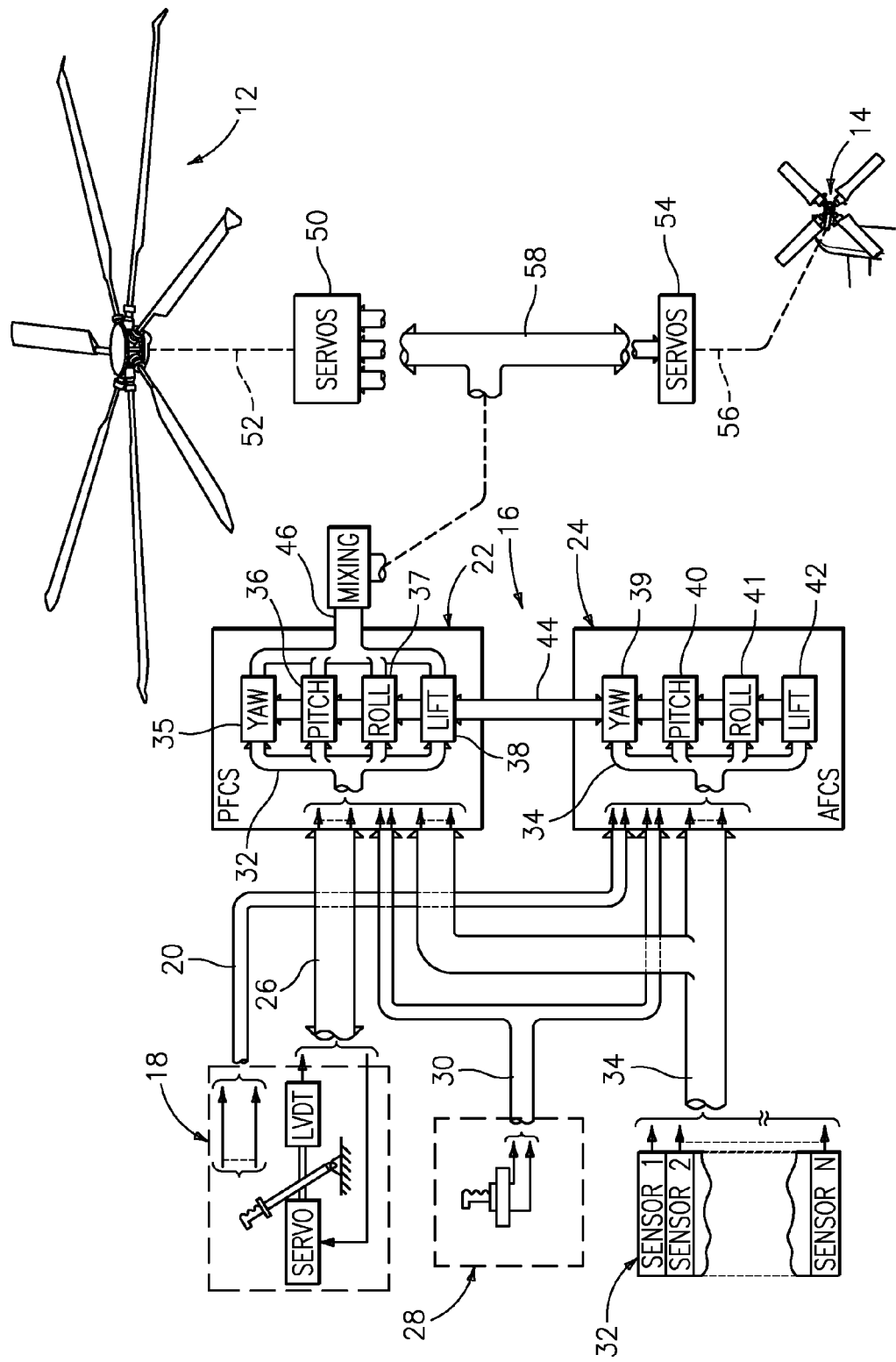
FIG. 2 is a block diagram of a model following flight control system.

Referring to FIG. 2, a fly-by-wire type flight control system 16 includes a model following control system which shapes the pilot's controller and displacement commands through an inverse vehicle model to produce the desired aircraft response. The system includes a Primary Flight Control System (PFCS) 22 and a Automatic Flight Control System (AFCS) 24. The PFCS 22 and AFCS 24 each receive the force output command signals of a collective controller 18 on line 20, a cyclic controller 28 on lines 30, and the aircraft's sensed parameter signals from sensors 32, on lines 34. The collective control 18 and the cyclic control 28 may take various forms including sidearm controllers or other such control controllers. The pilot command signals on lines 20, 26, 30 and the sensed parameter signals on lines 34 are shown consolidated within trunk lines 32 and 34 in the PFCS and AFCS, respectively.

The PFCS and AFCS may each contain separate control channel logic laws for controlling the yaw, pitch, roll and lift axes of the aircraft. The logic is included in the PFCS and AFCS control modules (schematically represented by blocks 35-38 for the PFCS and blocks 39-42 for the AFCS). The sensed parameter signals from aircraft sensors 32, on lines 34, provide the PFCS and AFCS with the aircraft's angular rate and attitude response to the rotor command signals. The PFCS logic provides rotor command signals and the AFCS logic provides conditioning and/or trimming of the PFCS four axis logic functions. The PFCS and AFCS logic modules interconnect through bus 44 to provide rotor command signals on output lines 46 to a mixing function 48 which communicates commands on lines 58 for the displacement of servos 50 and linkages 52 to control the tip path plane of the main rotor 12. A mixed command signal is also provided on line 58 to the helicopter's tail rotor servos 54 which control the thrust of the tail rotor 14 through linkages 56.

Figure 3:
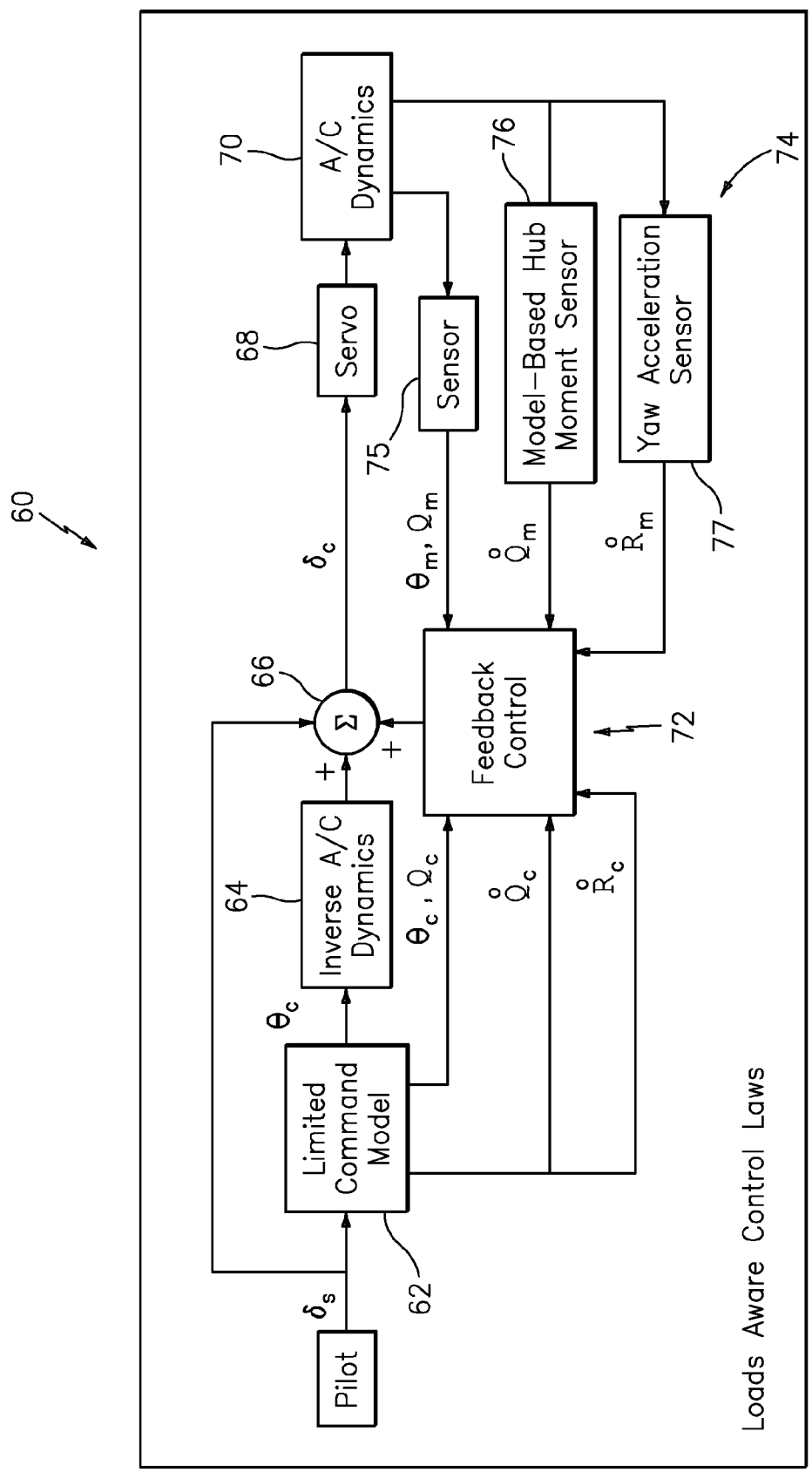
FIG. 3 is a block diagram of a loads aware control law algorithm.

Referring to FIG. 3, a loads aware control law algorithm 60 is schematically illustrated in a block diagram format. The flight control system 16 utilizes model-following architecture to implement the loads aware control law algorithm 60. The loads aware control law algorithm 60 may be microprocessor based with a central processing unit, memory (RAM and/or ROM), with associated input and output buses, and/or may be a portion of a central vehicle main control system, an interactive vehicle dynamics module, or stand-alone controllers. Control law algorithms are the scheme by which the decisions are made.

The loads aware control law algorithm 60 includes a limited command model 62, which communicates through an inverse aircraft dynamics model 64 to a summing junction 66 which drives a servo system 68 to control aircraft dynamics 70 which are here disclosed as pitch control of the aircraft rotor hub. A feedback control loop 72 also communicates through the summing junction 66. The feedback control loop 72 receives control signals from the limited command model 62 as well as response signals from the aircraft dynamics 70 though a sensor system 74. The sensor system 74 includes a sensor suite 75 which directly measures aircraft dynamics such as aircraft pitch rate (Qm) and aircraft roll rate (Θm) through, for example, an inertial measurement unit (IMU). The sensor system 74 also includes a model-based rotor-hub moment sensor algorithm 76 here illustrated for the longitudinal or pitch axis. The model-based rotor-hub moment sensor algorithm 76 provides a pitch acceleration (Q-dot) signal to the feedback control loop 68 without the requirement of a specially instrumented rotor hub typical of flight test instrumented aircraft. Such flight test instrumented aircraft, although effective for testing, are not robust enough to be practical in a field environment. Other model-based moment sensor algorithms 77 such as a yaw acceleration sensor which provides a yaw acceleration (R-dot) signal to the feedback control loop 68 may also benefit from the present invention.

Figure 4:
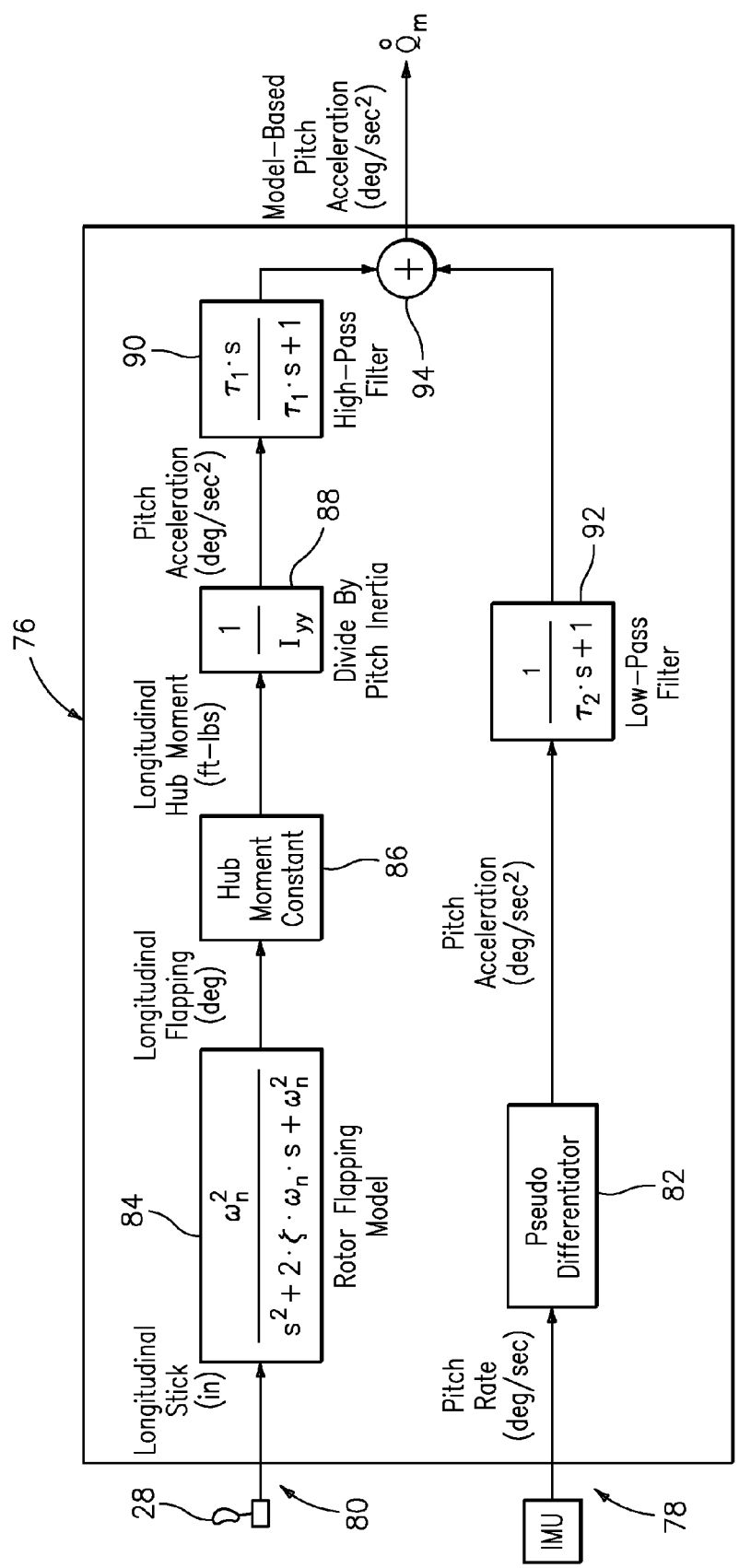
FIG. 4 is a block diagram of a model-based moment sensor algorithm according to the present invention.
Figure 5A:
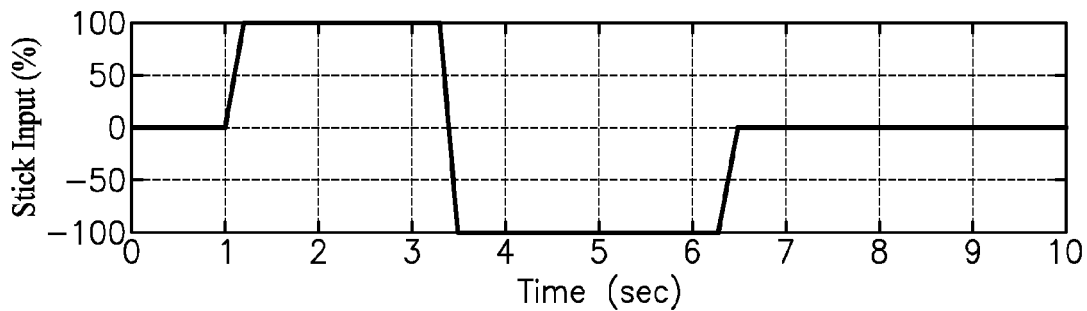
FIG. 5A is a a graphical representation of a flight control stick input.
Figure 5B:
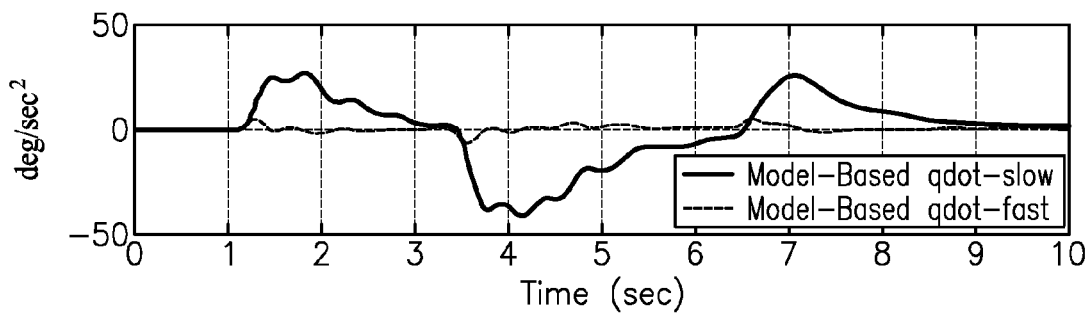
FIG. 5B is a graphical representation of Actual and Model Based Longitudinal Cyclic Position.
Figure 5C:
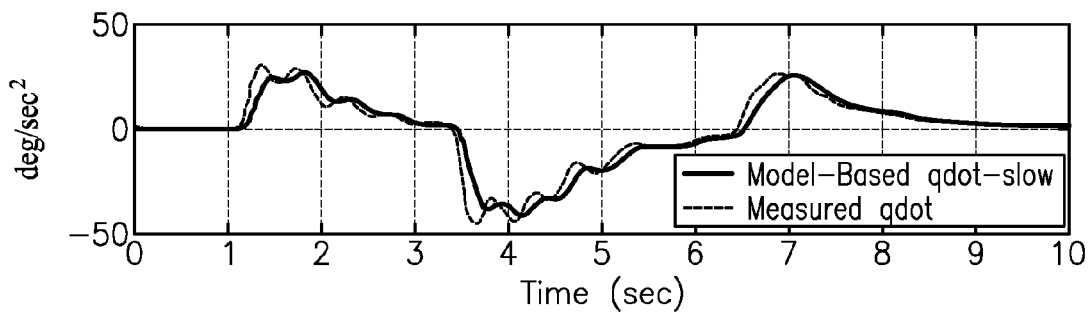
FIG. 5C is a graphical comparison of Actual and Model Based Pitch Rate.
Figure 5D:
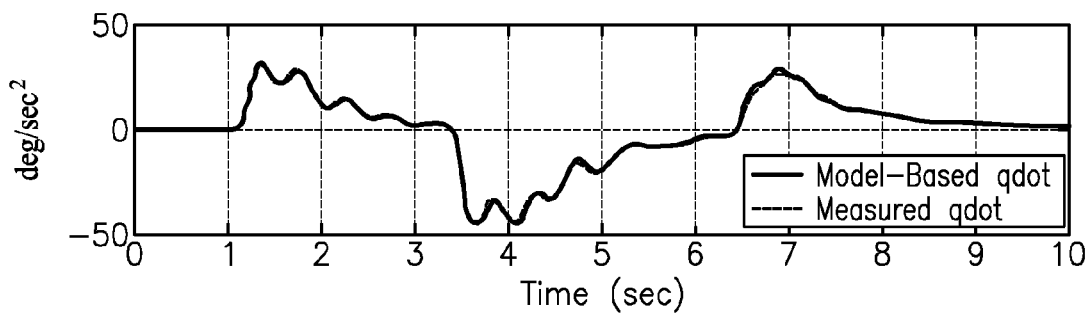
FIG. 5D is a graphical comparison of Actual and Model Based Pitch Acceleration.

Referring to FIG. 4, the model-based moment sensor algorithm 76 which provides a model-based pitch acceleration (Q-dot) signal to the feedback control loop 68 is schematically illustrated in a block diagram format. It should be understood that although the disclosed embodiment is discussed in terms of a model-based implementation in the longitudinal or pitch axis, the approach of the present invention is also applicable to the roll axis and yaw axis.

The model-based moment sensor algorithm 76 includes two primary paths 78, 80. The two paths are calculated in parallel and then combined using a complementary filter like process. Stick input and pitch rate (Q) are readily provided as standard signals by the fly-by-wire flight control system 16. An inertial measurement unit (IMU) may, for example, provide the pitch rate, while the longitudinal stick measurement may be obtained from a cyclic stick sensor.

The pitch rate path 78 starts with the measured pitch rate in degrees/sec then differentiates the pitch rate (Q) at pseudo integrator 82 to obtain pitch acceleration (Q-dot) in degrees per second squared. The differentiation may be performed numerically by taking a time sample at time T and a time sample at time T plus to determine slope and obtain Q-dot. This, however, inherently requires a period of time to process such that by the time Q-dot is determined, the path is essentially one time step beyond when that Q-dot actually occurred. That is, being based on rate, which is one integration away from the acceleration, the pitch rate path 78 estimation is, by its very nature, "slower" than the actual physical acceleration. However, because the pitch rate path 78 is based on the actual aircraft response, the pitch rate path 78 includes all aircraft effects and is a good estimate of the long-term trends in pitch acceleration.

The stick input path 80 starts with stick input which is passed through a rotor flapping model 84 which is a model of the rotor flapping dynamics to obtain an estimate of rotor system longitudinal flapping in degrees. The attractiveness of this is that the rotor flapping model 84 is a relatively simple second order equation based on rotor characteristics readily constructed or extracted from flight test based linear models.

The rotor system longitudinal flapping signal form the rotor flapping model 84 is then multiplied by a hub moment constant 86 (which is a commonly used estimate of hub moment in in-lbs/degree of flapping) to obtain a hub moment signal. The hub moment constant is a mathematical construct which depends on constants such as number of rotor blades, rotor speed, rotor weight, etc., which is typically expressed in foot pounds of moment per degree of flapping. The hub moment signal is then divided by pitch inertia 88 to obtain a pitch acceleration estimation signal. Because this estimate is calculated using the stick measurement and the flapping model, the stick input path 80 provides a relatively "fast" estimate that accurately captures transient flapping response. However, because the stick input path 80 does not include the aircraft response directly, the stick input path 80 will depart from the actual acceleration over longer time periods.

The pitch rate path 78 and the stick input path 80 estimates are then combined using a complementary filtering technique. The stick input path 80 "fast" estimate is passed through a high pass filter 90 and is added to the pitch rate path 78 "slow" estimate, which has been passed through a low pass filter 92. The low pass filter 92 is used to "clean up" the differentiated rate by filtering out any noise introduced by the differentiation process. The filtered estimates are then summed at summing junction 94 to produce a balance of low frequency and high frequency that provides an accurate estimate of rotor hub angular acceleration (FIGS. 5A-5D).

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fly-by-wire flight control system comprising:
   a model-based sensor system which estimates an angular acceleration of an aircraft flight control with at least one model and data from at least one sensor in communication with said at least one model to obtain an angular acceleration estimate; and
   a flight control law in communication with said model based sensor system to control a moment applied to the aircraft flight control using at least said angular acceleration estimate to reduce a load applied to an aircraft.

2. The fly-by-wire flight control system as recited in claim 1, wherein said aircraft flight control includes a main rotor hub.

3. The fly-by-wire flight control system as recited in claim 2, wherein said model based sensor system estimates angular pitch accelerations of said main rotor hub.

4. The fly-by-wire flight control system as recited in claim 2, wherein said model based sensor system estimates angular roll accelerations of said main rotor hub.

5. The fly-by-wire flight control system as recited in claim 1, wherein said at least one model includes a rotor flapping model.

6. The fly-by-wire flight control system as recited in claim 5, wherein an output from said rotor flapping model is multiplied by a hub moment constant.

7. The fly-by-wire flight control system as recited in claim 1, wherein said aircraft flight control includes a cyclic control system.

8. The fly-by-wire flight control system as recited in claim 1, wherein said aircraft flight control includes a tail rotor.

9. The fly-by-wire flight control system as recited in claim 1, wherein said model based sensor system includes an angular rate path and a stick input path which are calculated in parallel then combined through a complementary filter prior to input to said flight control law.

10. A method of flight control for, a rotary-wing aircraft comprising:
    estimating angular accelerations of an aircraft flight control using at least one model and data from at least one sensor to obtain an angular acceleration estimate; and
    using at least said angular acceleration estimate, controlling a moment applied to said aircraft flight control to reduce a load applied to said aircraft.

11. A method as recited in claim 10, wherein said estimating further comprises:
    performing a first estimation of angular acceleration from a stick input;
    at least partially in parallel with performing a first estimation, performing a second estimation of angular acceleration from a rate; and
    filtering through a high-pass filter the angular acceleration determined from the first estimation ;
    filtering through a low-pass filter the angular acceleration determined from the second estimation; and
    combining results of said and filtering through a high pass filter and filtering through a low pass filter to obtain the angular accelerations of the aircraft flight control.

12. A method as recited in claim 11, wherein said performing a first estimation further comprises:
    communicating the stick input through a rotor flapping model to determine an estimate of rotor flapping; and
    multiplying the estimate of rotor flapping by a rotor hub moment constant.

13. A method as recited in claim 10, wherein said estimating further comprises:
    performing a first estimation of a rotor system angular acceleration from a stick input;
    at least partially in parallel with performing a first estimation, performing a second estimation of the rotor system angular acceleration from an angular rate; and
    filtering through a high-pass filter the rotor system angular acceleration determined from the first estimation;
    filtering through a low-pass filter the rotor system angular acceleration determined from the second estimation; and
    combining results filtering through a high-pass filter and filtering through a low-pass filter to obtain the angular accelerations of the aircraft flight control.

14. A method as recited in claim 10, wherein said controlling further comprises:
    controlling the moment applied to the aircraft flight control to limit a load applied to an aircraft structure of said aircraft.

15. A method of estimating angular acceleration of a rotary-wing aircraft rotor system comprising the steps of:
    performing a first estimation of angular acceleration from a stick input;
    filtering the angular acceleration determined using the first estimation;
    filtering the angular acceleration determined using the second estimation; and
    combining filtered results from said filtering the angular acceleration determined using the first estimation and said filtering the angular acceleration using the second estimate to obtain an estimate of the angular acceleration of the rotary-wing aircraft rotor system.

16. A method as recited in claim 15, wherein said performing a first estimation and said performing a second estimation are performed in parallel.

17. A method as recited in claim 15, wherein:
    filtering the angular acceleration determined using the first estimation further comprises filtering through a high-pass filter the angular acceleration determined using the first estimation;
    filtering the angular acceleration determined in using the second estimation further comprises filtering through a low-pass filter the angular acceleration determined using the second estimation; and
    combining further comprises combining results said filtering through a high-pass filter and said filtering through a low pass filter to obtain an estimate of the angular acceleration of the rotor system.

18. A method as recited in claim 15, wherein said performing a first estimation further comprises:
    communicating the stick input through a rotor flapping model to determine an estimate of rotor flapping;
    multiplying the estimate of rotor flapping by a rotor hub moment constant to obtain a hub moment estimate.

19. A method as recited in claim 18, wherein said performing a first estimation further comprises:
    dividing the hub moment estimate by an inertia to obtain an angular acceleration.

20. A method as recited in claim 15, wherein said performing a second estimation further comprises:

communicating the rate through a differentiator to determine an acceleration estimate.

21. A method as recited in claim 15, wherein:
a first model and data from at least one sensor is in communication with said first model to obtain the first estimation; and
a second model and data from at least one sensor is in communication with said second model to obtain the second estimation.

* * * * *